United States Patent [19]

Carlson et al.

[11] 4,403,716
[45] Sep. 13, 1983

[54] AUTOMOBILE SUPPORT RACK

[76] Inventors: Gerald I. Carlson, 10 Paquin Rd., Barrington, R.I. 02806; Norman J. Cook, 91 River Vue Ave., Warwick, R.I. 02889

[21] Appl. No.: 382,129

[22] Filed: May 26, 1982

[51] Int. Cl.³ .............................................. B60R 9/06
[52] U.S. Cl. ........................... 224/42.08; 224/42.03 B
[58] Field of Search ...................... 224/42.08, 42.03 R, 224/42.03 B, 42.07, 42.08, 42.44; 280/289 A, 35, 769

[56] References Cited

U.S. PATENT DOCUMENTS

| | | | |
|---|---|---|---|
| 2,206,444 | 7/1940 | Beckwith | 224/42.08 |
| 2,593,908 | 4/1952 | Monteverde | 224/42.08 |
| 3,161,973 | 12/1964 | Hastings | 224/42.03 R X |
| 4,125,214 | 11/1978 | Penn | 224/42.08 |

FOREIGN PATENT DOCUMENTS 998825  1/1952  France .............................. 224/42.03

*Primary Examiner*—Steven M. Pollard
*Attorney, Agent, or Firm*—Robert J. Doherty

[57] ABSTRACT

A support rack for vehicles, i.e., automobiles, and the like which is particularly adapted for alternate support and storage of bicycles in one position and for the storage of general materials such as trunks, trash barrels, camping equipment gear, and the like in an alternate position. The storage rack includes a frame which in the bicycle supporting position is positioned in an upright attitude and in the general material supporting position is in a generally horizontal position vis-a-vis the rear or front end of the vehicle on which it is supported. The rack is preferably positioned in an area of low air turbulence at the rear end of the vehicle.

10 Claims, 10 Drawing Figures

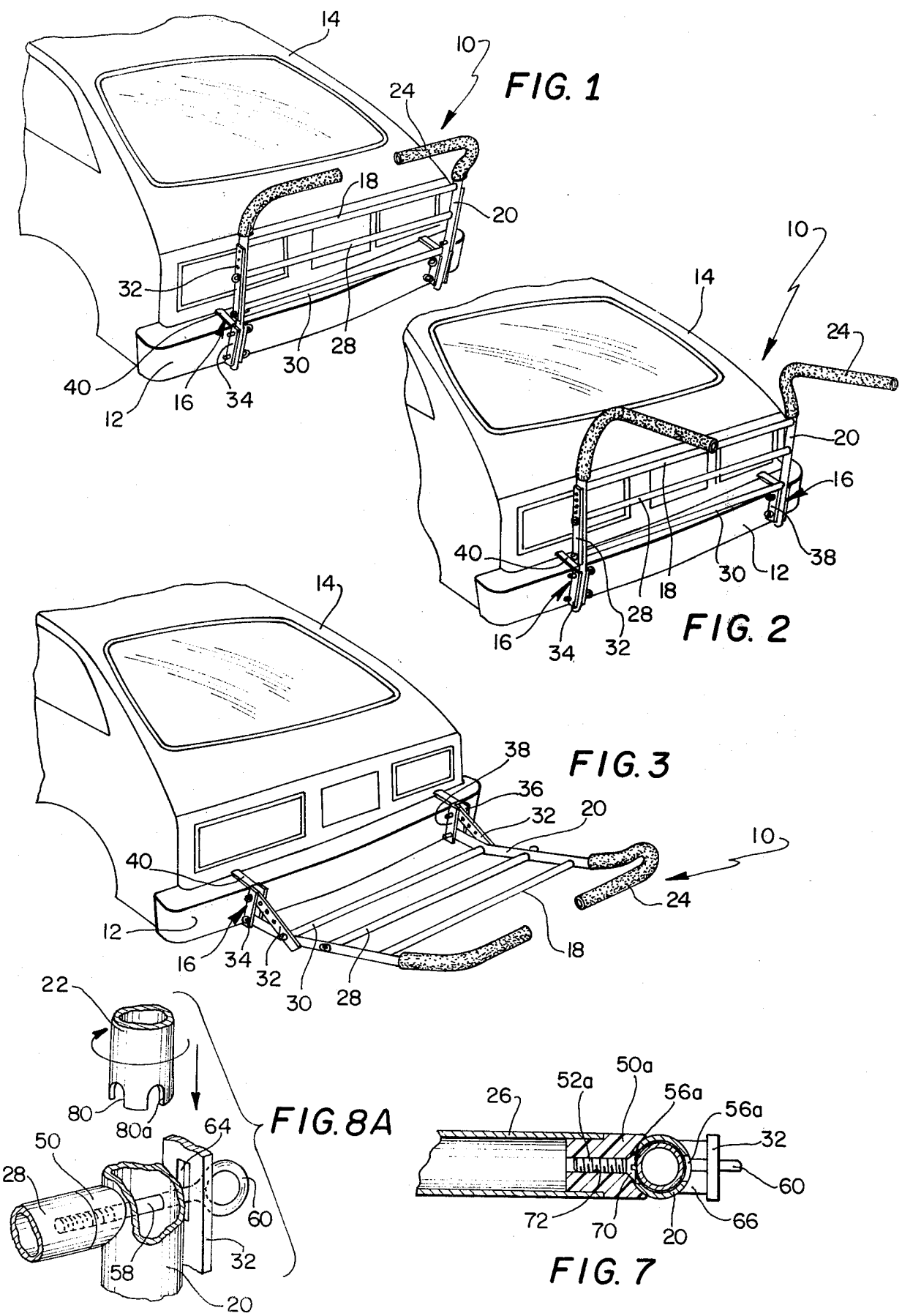

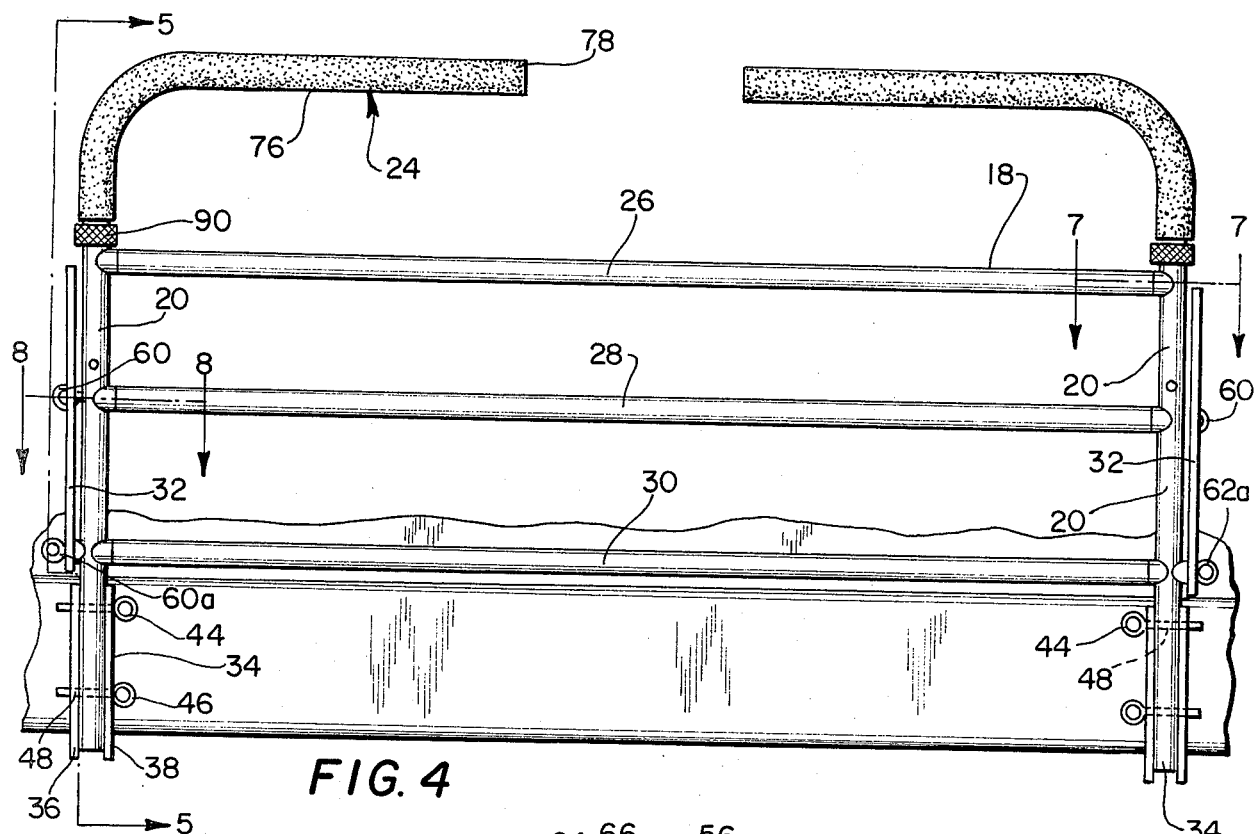
FIG. 4
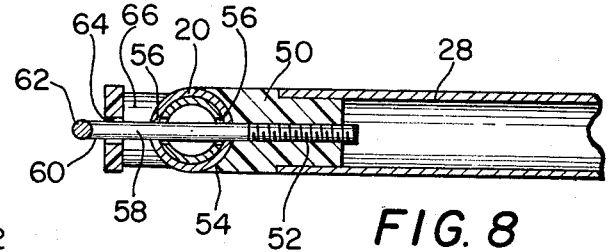
FIG. 8
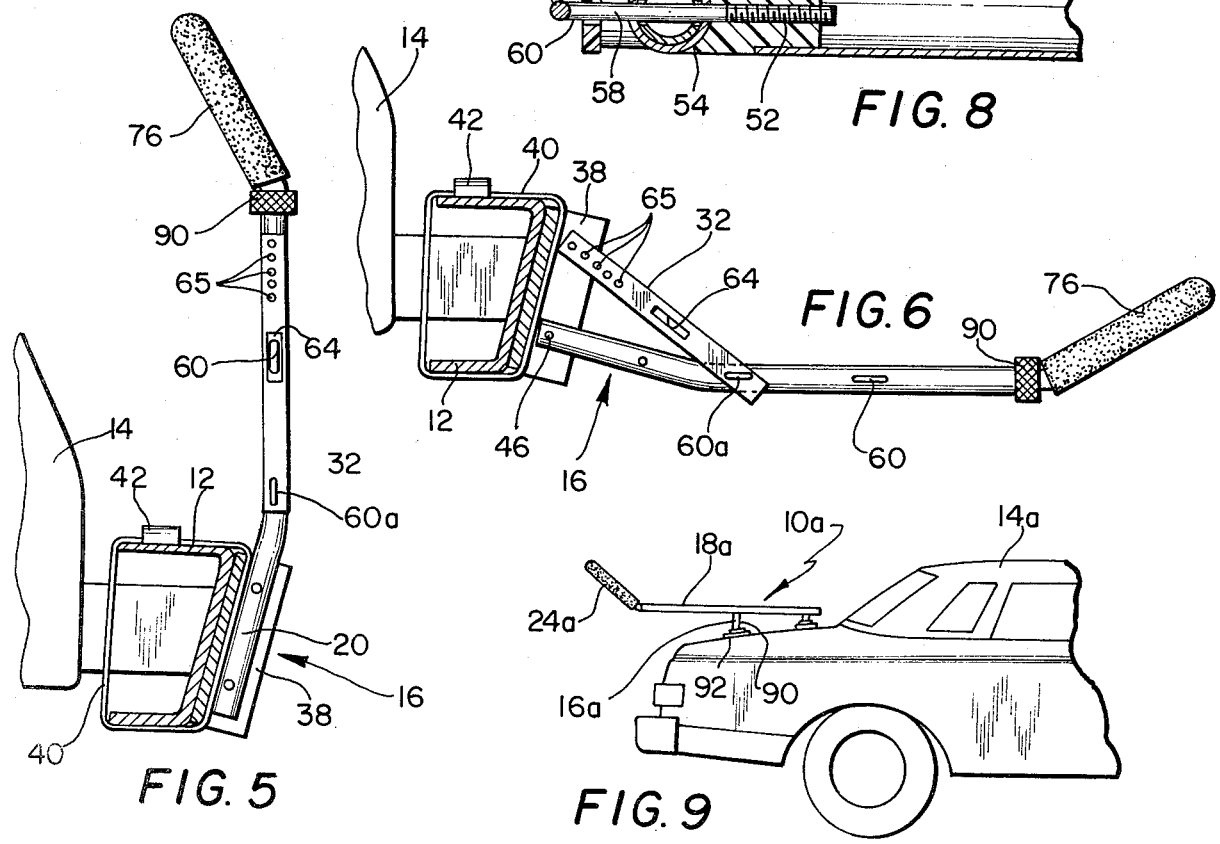
FIG. 5
FIG. 6
FIG. 9

AUTOMOBILE SUPPORT RACK

BACKGROUND AND OBJECTS OF THE INVENTION

Support racks for automobiles and the like are well known and may be configured to serve a particular purpose, i.e., to support bicycles. Such racks are normally positioned on the rear bumper of an automobile and support the bicycles in a crosswise position with respect to the body of the automobile. Other support racks are utilized for general material and often include racks supported on the roof or rear deck of an automobile wherein camping equipment and the like may be transported from one place to the other. It is also known to mount trunk-like supports on the rear of automobiles, for instance, cars in the early 1920's and prior to that time were so outfitted.

There, however, remains a need for a support rack which is especially adapted for placement on modern automobiles and yet which may serve to accomplish all of the features of the aforementioned known rack constructions. These and other objectives of the present invention may be accomplished by the provision of a rack which is adapted for positioning in the rear area of a modern automobile and which by movement of component parts thereof to alternate positions may serve either as a sepecialized support rack for bicycles, skis or a more general support for other and more conventional articles in an alternate position thereof. Accordingly, such rack includes a frame comprising a pair of laterally separated posts pivotally connected at their ends to positioning means by which the rack is attached to the automobile and interconnected to each other by laterally extending crossmembers and a pair of essentially L-shaped handle members supported at the outer ends of said posts for at least limited rotational movement in a plane normal to the longitudinal extent of said posts, said frame pivotally movable with respect to said positioning means between a first upright substantially vertical position where said handle members may be rotated to a rearwardly extending position normal to the main plane of said frames for support of a bicycle and the like to a second substantially horizontal position where said frame extends rearwardly from the rear of said automobile for support of luggage and the like.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the rear portion of an automobile showing the support rack of the present invention in its upright storage position;

FIG. 2 is a perspective view similar to FIG. 1 but showing the handle members of the rack rotated 90° to a bicycle support position;

FIG. 3 is a perspective view similar to FIGS. 1 and 2 but showing an alternate position in which the frame of the support rack may be placed so as to support general merchandise such as camping equipment, rubbish barrels, and the like;

FIG. 4 is a front elevational view of the support rack in its upright storage position as shown in FIG. 1;

FIG. 5 is a side sectional view taken along the line 5—5 of FIG. 4;

FIG. 6 is a side sectional view similar to FIG. 5 but showing the rack placed in its alternate frame position such as shown in FIG. 3 of the drawings;

FIG. 7 is a sectional view taken along the line 7—7 of FIG. 4;

FIG. 8 is a sectional view taken along the line 8—8 of FIG. 4;

FIG. 8a is a perspective view of a portion of the rack and shows in particular the manner in which the handle portion thereof may be partially rotated to alternate positions such as shown in the transition between FIGS. 1 and 2; and FIG. 9 shows an alternate manner in which the support rack of the present invention may be mounted on an automobile.

DESCRIPTION OF THE INVENTION

Turning now to the drawings and more particularly to FIGS. 1, 4, and 5, the support rack 10 of the present invention is shown mounted on the rear bumper 12 of a hatchback-type automobile 14 by means of positioning means 16. The rack includes a frame 18 including a pair of laterally separated posts 20 formed from tubular material and exhibiting open upper ends. The lower base portions 22 of the opposed generally L-shaped handle members 24 are adapted to extend into the hollow upper ends of the posts 20 so as to be supported thereby. The extent to which the base ends of the handle members 24 extend into the post will be described hereinafter. A plurality of cross members laterally extend between the posts and are connected to at opposite ends thereof. There are at least two such members and they may extend either directly across as shown or, may be crisscrossed, or disposed in another suitable supportive fashion. Three such members 26, 28, and 30 are depicted here. The upper member 26 serves to stiffen the frame 18 as do the other members. The second or middle member 28 in addition to serving the above-indicated sitffening function, further serves to limit the downward extent of the handle-shaped member 24 within the open post 20.

The member 28 also serves to position a strut 32 when such is disposed in its upright position corresponding to FIGS. 1, 4, and 5. Similarly, the lower member 30 serves to pivotally attach the strut 32 at its lower end such that it may be moved from the position shown in FIGS. 1, 4, and 5 to the position shown in FIGS. 3 and 6. The posts, the cross members, and the handle members may be formed from light weight tubular metal stock such as aluminum.

The positioning means 16 includes a rearwardly opening U-shaped member 34 including a pair of spaced plates 36 and 38 which are attached to the bumper 12 by means of a strap 40 extending around the bumper and tightened by any suitable fastening means 42. In this fashion, the U-shaped member 34 forms a channel between plates 36 and 38 in which a running length of the strap 40 may be positioned and in which the lower end of the tubular posts 20 are inserted. Thereafter, the posts are pinned in position by a pair of bolts 44 and 46. The bolts are received in openings 48 provided in the opposed plates 36 and 38 and may either be fixed thereto by means of conventional nuts, threadably engaged in the openings 48 or by any other suitable means.

Referring now to FIG. 8 in particular, the open ends of the tubular member 30 are provided with a friction-fitted plug 50 which in turn includes a centrally located threaded bore 52. The plug is arcuately shaped at its face 54 to receive the post 20. The post 20 includes a pair of aligned openings 56 through which the shaft 58 of a bolt 60 passes. The ring-shaped head 62 of such bolt 60 is essentially flat and is adapted to extend partially into an open slot 64 extending through the upper end of the strut 32. The other end of the bolt 60 is threaded and is, accordingly, received in the threaded bore 52 of the plug 50 and thus serves to interconnect the post to the member 28.

The lower member 30 is similarly connected to the post 20 with the exception that an outer cap 66 is positioned over the post and between the lower end of the strut 32 and the entire head 62a of a bolt 60a is positioned laterally of the strut, that is, it does not extend into a slot positioned in the lower end of the strut 32 but the shaft 58 thereof extends through a conventional opening in the strut, i.e., a circular opening (not shown). In this way, the bottom end of the strut 32 is pivotally fastened to the post while the post is connected to the lateral member 30. When it is desired to move the strut from the storage position described, it is simply necessary to slightly loosen the lower bolt 60a in order to facilitate enough lateral play between the strut 32 and the post such that the upper end of the strut may be urged laterally away from the post 20 in order to clear the head 62 of the upper bolt 60. Thereafter, the strut may be upwardly swung around its pivotal connection afforded by the lower bolt 60a to the position shown in FIGS. 3 and 6 of the drawings. The upper pin 44 is removed to enable the frame 18 to downwardly rotate about its pivotal connection with the pin 46. A plurality of the openings 65 are provided in the upper end of the strut 32 such that relatively different angular and thus height positions of the frame may be achieved depending on which of the openings 65 is aligned with the upper openings 48 through the plates 36 and 38 and through which the pin 44 previously removed therefrom is reinserted. It will thus be apparent that not only does the above construction facilitate the movement of the frame 18 between the alternate positions shown in FIGS. 1 and 3 of the drawings, but in its upright position provides for the storage of the supporting struts 32 in an unique and entirely self-contained manner.

Turning now to FIGS. 7, 8, and 8a, the particular construction which enables the rack to move between the positions shown in FIGS. 1 and 2 of the drawings will now be explained. In FIG. 7, the upper member 26 is provided with a plug 50a similar to plug 50. The post 20 is also provided with a pair of openings 56a but in this case the openings are larger than those described in the previous connection mechanisms so as to receive the enlarged head of a flat end screw 70, the threaded shaft 72 of which is adapted to engage the threaded bore 52a. In this manner, the connection of the upper lateral member 26 is more permanent than the connection between the post 20 and the lateral members 28 and 30; however, it should be pointed out that all the connections may be assembled with relative ease and disassembled with equal ease should the occasion arise for replacement of parts and the like.

The handle-shaped members 24 include a handle portion 76 and the aforementioned base portion 22. The handle members are provided with a resilient covering 78 of polymeric foam, rubber, and the like to serve to cushion and avoid scratching the bicycles, luggage or other items which they are particularly adapted to carry. This covering 78 is applied to that portion of the handle member 24 which normally extends above the post 20. The bottom end of the base portion 22 is provided two pairs of aligned, circumferentially-spaced notches 80 and 80a adapted to receive the shaft 58 of the bolt 60. Thus when the handle members 24 are oriented as shown in FIG. 1 and forced downwardly into the open end of the post 20, the pair of aligned notches 80 will receive such shaft 58 to insure such position. Thereafter when it is desired to partially rotate the handle members 24 to the position shown in FIG. 2, the handle members 24 are upwardly withdrawn at a slight distance from the post 20 so as to clear the notches, rotated the desired extent so as to align the other pair of opposed notches 80a and then forced downwardly so as to engage the notches 80a with the shaft 58. In this way the handle members are secured, that is, prevented from further rotation in their alternate positions. The upper end of the post 20 may be provided with threads such that a friction ferrule 90 of otherwise standard construction may be received on an intermediate portion of the base portion 22 of the handle members 24 and upon tightening thereof, serve to fix the handles 24 in either of the positions depicted, that is, prevent the handles from moving outwardly of the posts. Other handle locking means such as snap buttons or pins (not shown) may act between the base portion 22 and the posts to relatively position these parts in the above-described inner position.

The positioning of the support rack 10 as shown in FIGS. 1 through 3 is particularly desirable inasmuch as such position is almost entirely within the area of low turbulence (dead space) created by the forward movement of the automobile 14 and thus the rack when not utilized to support articles and the like minimizes any resistance air drag, whistling, and the like often caused by mounting racks in positions in which they receive higher wind flow.

Similarly, the support rack 10a may be mounted in an alternate position which is shown in FIG. 9 of the drawings. In such position, the frame 18a thereof is affixed to the more conventional rear deck lid of the automobile 14a depicted therein by means of alternate positioning means 16a in the form of a plurality of posts 90 terminating in bases 92 which may be rubber suction cups. The rack 10a is also capable of movement between alternate handle positions as illustrated in FIGS. 1 and 2.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A multi-purpose support rack adapted for operative positioning at an end of an automobile and including means for positioning said rack thereat, said rack further including a frame comprising a pair of laterally separated posts pivotally connected at their inner ends to said positioning means and interconnected to each other by laterally extending crossmembers and a pair of essentially L-shaped handle members supported at the other ends of said posts for at least limited rotational movement with respect to said posts, said frame pivotally movable with respect to said positioning means between a first, upright, substantially vertical position where said handle members may be rotated to a rearwardly extending position normal to the plane of said frame for support of a bicycle and the like to a second substantially horizontal position where said frame extends outwardly from an end of said automobile for support of luggage and the like.

2. The support rack of claim 1, each of said posts having a strut pivotally attached at one end thereof to said post at a position proximal to but spaced from said inner end thereof, said position corresponding to the connection of one of said lateral members with said post, said strut movable from an upright storage position along said post in said first position thereof to an angular supporting position wherein the other end of said strut is connected to said positioning means.

3. The support rack of claim 2, including separate first connecting means for connecting each end of said one lateral member to said posts, said first connecting means simultaneously serving to connect said struts to said posts.

4. The support rack of claim 3, said posts and said lateral members being tubular and said first connecting means being a bolt having an enlarged hand-manipulatable head, said bolt sequentially passing through said strut and said post and connected to a plug supported at the end of said one lateral member.

5. The support rack of claim 1, said posts being tubular, second connecting means for connecting one end of another of said lateral members with one of said posts at a position proximal to but spaced from the outer end of said one post, one of said handle members adapted to extend into said outer post end for support thereby, said handle member having a base portion and a handle portion, said second connecting means extending across the hollow interior of said tubular posts for contact with and so as to limit the extent to which the base portion of said handle member may extend into such post, the end of said handle portion further adapted to engage said second connecting means in a rotationally locked position.

6. The support rack of claim 5, said second connecting means including a shaft extending across said post, said handle portion terminating in an end having circumferentially spaced notches adapted to alternatively receive said shaft corresponding to said first and second rotational positions of said handle member.

7. The support rack of claim 6, said second connecting means being a bolt having an enlarged hand-manipulatible head, said bolt passing through said post and connected to a plug supported at the end of said another lateral member.

8. The support rack of claim 2, said posts being tubular, second connecting means for connecting one of another of said lateral members with one of said posts at a position proximal to but spaced from the outer end of said one posts, one of said handle members adapted to extend into said outer post end for support thereby, said handle member having a base portion and a handle portion, said second connecting means extending across the hollow interior of said tubular post for contact with and so as to limit the extent to which the base portion of said handle member may extend into such post, the end of said handle portion further adapted to engage said second connecting means in a rotationally locked position, said second connecting means being a bolt having a threaded shaft and an enlarged, essentially flat, hand-manipulatible head, said other end of said strut having an open slot, said bolt sequentially passing through said slot and said post and the end of said another lateral member when said strut is in its upright storage position and aligned with its respective post.

9. The support rack of claim 8, said bolt threadably connected to a plug supported at said end of said another lateral member.

10. The support rack of claim 8, said strut adapted to be laterally flexed about its inner post connection so as to release said strut from contact with said second connection means bolt head in its storage position so it can be moved to its angular frame-supporting position.

* * * * *